Nov. 30, 1926.  1,608,760
H. W. D. ARMSTRONG
GARAGE DOOR OPENING AND CLOSING DEVICE
Filed Oct. 12, 1925
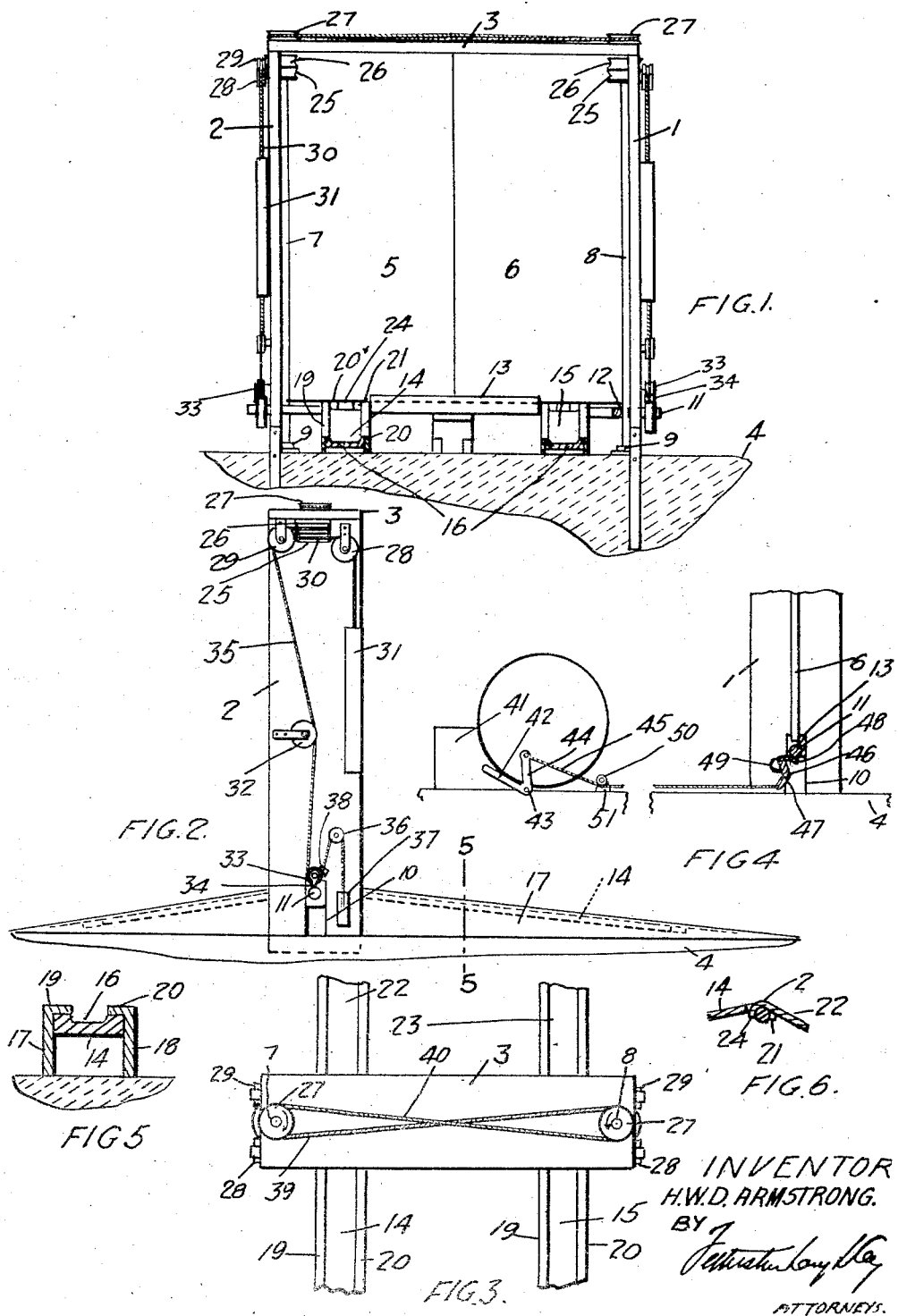
INVENTOR
H.W.D. ARMSTRONG.
BY
ATTORNEYS.

Patented Nov. 30, 1926.

1,608,760

UNITED STATES PATENT OFFICE.

HARRY WILLIAM DUDLEY ARMSTRONG, OF TORONTO, ONTARIO, CANADA.

GARAGE-DOOR OPENING AND CLOSING DEVICE.

Application filed October 12, 1925. Serial No. 62,058.

My invention relates to improvements in garage door opening and closing devices, and the object of the invention is to devise simple means which is operated by the weight of an automobile for automatically opening the garage doors as the automobile approaches them when entering the garage, and for automatically closing such doors behind the automobile as it passes into the garage, and simultaneously locking the doors after they are closed and automatically releasing such locking means prior to the opening of the doors, and at the same time to provide means whereby the door members are coupled together so as to operate positively in unison, and it consists essentially of the arrangement and construction of parts as hereinafter more particularly explained.

Fig. 1 is a front elevation of my doors and door frame, and my door opening and closing apparatus applied thereto, looking towards the outside of the doors.

Fig. 2 is a side elevation of the parts shown in Figure 1.

Fig. 3 is a plan view showing the door frame and a portion of the tread plate, and the means for coupling the doors together to operate in unison.

Fig. 4 is a longitudinal sectional view intermediately broken away of its length showing the locking mechanism, and means for operating the same.

Fig. 5 is a sectional view on line 5—5, Figure 2.

Fig. 6 is a detail view showing the connection between the tread plates and the depressible cross bar.

In the drawings like characters of reference indicate corresponding parts in each figure.

1 and 2 are the vertical members of the door frame, and 3 the horizontal top member.

4 is a substructure forming in the floor of the garage in which the lower ends of the uprights 1 and 2 are secured.

5 and 6 are the leaves of the door provided at their outer vertical edges with spindle portions 7 and 8 formed integral with the door and turnably mounted at their upper ends in the horizontal member 3 of the door frame, and at their lower ends in socket members 9. Each vertical member 7 and 8 is provided in proximity to its lower end with a vertical slot 10.

11 is a depressible cross bar extending at its ends through the slots 10 and projecting outward therefrom as clearly indicated in Figure 1. The cross bar 11 is provided with orifices 12 through which the turnable spindles 7 and 8 extend. The cross bar 11 is also provided with a lip 13 adapted to extend in front of the doors when they are in the closed position as indicated in Figures 1 and 4, so as to further lock the doors closed.

14 and 15 are outer tread members which are preferably grooved longitudinally as indicated at 16, Figure 5, so as to act as a gutter to drain off melting snow or rain. Each tread plate 14 and 15 is contained between the casing members 17 and 18 provided with lips 19 and 20 which extend over the tread members at each side of the recessed portion 16 so as to protect such members.

The inner ends of the members 14 and 15 are provided with hooks 20× and 21 which extend over the bar 11 in a spaced apart position.

22 and 23 are inner tread plates similar in construction to the outer tread plates, but shorter in length, and provided at their ends adjacent the garage doors with a hook 24 hooking over the rod 11 between the hook members 20× and 21.

It will be readily seen by referring to Figure 2 that the tread members 14 and 15 and 22 and 23 are free to move longitudinally to permit the depression of the cross bar 11 when they are subjected to the load of the automobile.

Each door member 5 and 6 is provided with a set of pulley members 25, 26 and 27 rigidly connected thereto so as to turn therewith as an integral part thereof.

28 and 29 are pulleys mounted in suitable brackets carried by the uprights 1 and 2.

30 is a cord or chain secured at one end to the pulley member 25 and extending over the pulley 28 and depending freely therefrom.

31 is a weight secured at the lower end of the depending portion of the cord 30.

32 is a pulley also carried in brackets secured to each vertical door member 7 and 8.

33 is a pulley secured at each end of the cross bar 11 in a suitably forked bracket 34.

35 is a chain or cord secured at one end to the pulley member 26 and extending over the pulley member 29 and depending downward so as to pass into engagement with the pulley 32 and beneath the pulley 33 and then upwardly over the pulley 36 also carried by each vertical 7 and 8. The depending end of the cord 35 is provided with a supplemental weight 37.

38 is a block secured to the cord or chain 35 between the pulley 33 and pulley 36.

39 is a cord or chain secured to the pulleys 27 so as to extend partially around the same and extending in an inclined direction from one side of said pulley 27 of the door member 5, to the opposite side of the corresponding pulley member 27 of the door member 6.

40 is a similar chain or cord which extends in the opposite direction to the chain or cord 39, passing around the opposite sides of the pulleys 27 as clearly indicated in Figure 3.

When the automobile approaches the garage, the wheels thereof are guided onto the tread members 14 and 15 so as to pass longitudinally thereof. These tread plates 14 and 15 are depressed by the weight of the automobile thereby carrying the cross bar 11 downward and the corresponding ends of the tread plates 22 and 23.

By the depression of the tread plates 14 and 15, the cords 35 are pulled upon the blocks 38 engaging the forks of the pulleys 33. By the downward pull upon the cords 35 the pulleys 25, 26 and 27 are turned in the direction of arrow (see Figure 3) to carry the door members 5 and 6 to the open position.

When the automobile passes into the garage through the open door and travels off the tread plates 22 and 23, the weights 31 which have been raised by the aforesaid pull upon the cords 35 are permitted to drop exerting a pull in the opposite direction upon the cords 30, and thereby exerting a pull upon the cord 35 connected to the pulley member 26, thereby pulling the cross bar 11 upward and turning the door members 5 and 6 in the opposite direction so as to carry them to the closed position.

At the extremity to the downward movement of the weight 31 the door members 5 and 6 are carried to the closed position. In order to raise the cross bar 11 further so as to carry the lip 13 to the locking position, the weight 37 operates to raise the cross bar a slight further distance carrying the lip 13 in front of the door members 5 and 6. In order to positively automatically lock the doors from the inside of the garage I provide the following mechanism.

41 is a stop block.

42 is a cross bar pivotally mounted at 43 normally in a substantially vertical position.

44 are arms extending from the cross bar 42.

45 is a cord connected to each arm 44.

46 is a locking member pivotally mounted at 47 and provided with a forwardly extending portion 48 at its upper end adapted to extend beneath the bar 11 and positively hold it in its upper position.

The locking member 46 is provided with a counter weight 49 and the lower end of the locking member is connected to the cord 45 which passes beneath the pulley 50 mounted in a suitable bracket 51.

When the automobile has entered the garage the wheels thereof as they engage the stop block 41 engage the cross bar 42 so as to swing it rearwardly into position shown in Figure 4 and thereby exert a pull upon the cords 45 so as to carry the locking member 46 to the locking position beneath the cross bar 11 as shown in this figure.

When the automobile is about to leave the garage the movement thereof away from the stop block 41 frees the cross bar 42 permitting the locking member 46 to drop in an inward direction by means of the counter weight 49 so as to pass from beneath the cross bar 11 and thereby free the doors before the wheels of the automobile pass onto the tread plates 22 and 23.

From this description it will be seen that I have devised a very simple form of garage door operating mechanism which will automatically operate to open and close the doors by the weight of the automobile and at the same time automatically lock such doors in the closed position after the automobile has entered the garage and automatically release such locking means prior to the automobile leaving the garage.

What I claim as my invention is:

1. In a garage door opening and closing device, the combination with the door frame and doors swingably mounted in the frame, of a cross bar extending beneath the doors, tread plates operated by the weight of a car to move the cross bar vertically downward, a cord and pulley mechanism connected to the cross bar to perform the door opening operation, a weighted cord and pulley mechanism for performing the door closing operation, and a supplemental weighted cord connected to said first cord and pulley mechanism and adapted to raise the cross bar into engagement with the outer face of the doors after the closing of the doors.

2. In a garage door opening and closing device, the combination with the door frame and doors swung in the frame, of a cross bar extending beneath the doors, tread plates for operating the cross bar, a cord connected to each end of the cross bar at one end and to the doors at the opposite end to swing the doors to the open position by the depression of the cross bar, a weighted cord also connected to the doors for returning the doors to their normal position and the cross bar into position of close proximity to the lower edge thereof, and a supplemental cord also connected to each end of the cross bar and each provided with a weight adapted to lift the cross bar from the aforesaid position into engagement with the outer face of the doors after the doors have been closed.

HARRY WILLIAM DUDLEY ARMSTRONG.